(12) United States Patent
Shihoh

(10) Patent No.: US 11,201,569 B2
(45) Date of Patent: Dec. 14, 2021

(54) VIBRATION ACTUATOR INCLUDING VIBRATION ELEMENT, AND APPARATUS

(71) Applicant: CANON KABUSHIKI KAISHA, Tokyo (JP)

(72) Inventor: Makoto Shihoh, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 267 days.

(21) Appl. No.: 16/587,396

(22) Filed: Sep. 30, 2019

(65) Prior Publication Data

US 2020/0112272 A1    Apr. 9, 2020

(30) Foreign Application Priority Data

Oct. 3, 2018 (JP) .............................. JP2018-188432

(51) Int. Cl.
*H02N 2/10* (2006.01)
*H02N 2/00* (2006.01)
(Continued)

(52) U.S. Cl.
CPC .............. *H02N 2/103* (2013.01); *G02B 7/04* (2013.01); *G02B 27/646* (2013.01); *H02N 2/006* (2013.01); *H02N 2/0065* (2013.01)

(58) Field of Classification Search
CPC ...... H02N 2/103; H02N 2/006; H02N 2/0065; H02N 2/026; H02N 2/0055; G02B 7/04; G02B 7/08; G02B 7/102; G02B 27/646
See application file for complete search history.

(56) References Cited

U.S. PATENT DOCUMENTS

| | | | | |
|---|---|---|---|---|
| 5,982,075 A | * | 11/1999 | Hayasaka | H02N 2/004 310/12.01 |
| 7,129,620 B2 | | 10/2006 | Sakano | |

(Continued)

FOREIGN PATENT DOCUMENTS

| | | |
|---|---|---|
| JP | H0664771 A | 3/1994 |
| JP | 2005312264 A | 11/2005 |

(Continued)

OTHER PUBLICATIONS

Office Action issued in Japanese Appln. No. 2018-188432 dated Aug. 25, 2020.

*Primary Examiner* — Emily P Pham
(74) *Attorney, Agent, or Firm* — Rossi, Kimms & McDowell LLP

(57) ABSTRACT

A vibration actuator that is reduced in the change of posture of a vibration element with respect to a contact body. The vibration element unit and the contact body are movable relative to each other. The vibration element unit includes a vibration element in contact with the contact body, a first holding member that holds the vibration element, a base, a first supporting member that is fixed to the base, and movably supports the first holding member in a direction orthogonal to a friction sliding surface of the contact body in slide contact with the vibration element, while maintaining the vibration element in a predetermined posture with respect to the contact body, and an urging unit that is arranged on the base independently of the first supporting member and presses the vibration element in a direction orthogonal to the friction sliding surface of the contact body.

17 Claims, 14 Drawing Sheets

(51) Int. Cl.
  *G02B 27/64* (2006.01)
  *G02B 7/04* (2021.01)

(56) References Cited

U.S. PATENT DOCUMENTS

| | | | |
|---|---|---|---|
| 10,461,667 | B2 | 10/2019 | Kojima |
| 10,574,156 | B2 | 2/2020 | Osawa |
| 2005/0253485 | A1* | 11/2005 | Kishi ............... H02N 2/103 310/323.16 |
| 2018/0367064 | A1 | 12/2018 | Shihoh |
| 2019/0348928 | A1 | 11/2019 | Yamamoto |

FOREIGN PATENT DOCUMENTS

| | | | |
|---|---|---|---|
| JP | 2013198264 | A | 9/2013 |
| JP | 2017011797 | A | 1/2017 |
| JP | 2017200260 | A | 11/2017 |
| JP | 2018124541 | A | 8/2018 |
| JP | 2018196284 | A | 12/2018 |
| JP | 2019003038 | A | 1/2019 |
| JP | 2019170079 | A | 10/2019 |

\* cited by examiner

A MODE

B MODE

RELATED ART

VIBRATION ACTUATOR INCLUDING VIBRATION ELEMENT, AND APPARATUS

BACKGROUND OF THE INVENTION

Field of the Invention

The present invention relates to a vibration actuator that includes a vibration element and is used for a linear drive device and a rotary drive device, and an apparatus equipped with the vibration actuator.

Description of the Related Art

There is known a vibration actuator that causes a vibration element to generate predetermined vibration to apply a frictional driving force (thrust) to a contact body in contact with the vibration element, and thereby moves the vibration element and the contact body relative to each other. In such a vibration actuator, in a case where the vibration element is fixed, the contact body is moved with respect to the vibration element by the frictional driving force, whereas in a case where the contact body is fixed, the vibration element is moved with respect to the contact body by a reaction force of the frictional driving force.

For the vibration actuator, as a method of obtaining desired output, there has been proposed a method of bringing a plurality of vibration elements into contact with a common contact body and applying the frictional driving force to the contact body by combining the frictional driving forces of the vibration elements. For example, a vibration actuator described in Japanese Laid-Open Patent Publication (Kokai) No. 2005-312264 includes a housing, a shaft horizontally arranged such that the shaft extends through sides of the housing, and two vibration elements vertically sandwiching the shaft. Further, in this vibration actuator, the two vibration elements sandwiching the shaft are further vertically sandwiched by two urging engagement members, and tension spiral springs are attached to respective longitudinal one ends of the two urging engagement members, whereby the two urging engagement members are vertically pulled to each other. Thus, the two vibration elements are brought into pressure contact with the shaft by the urging forces received from the two urging engagement members, and when vibration is excited in the vibration elements, the shaft is moved in an axial direction.

However, in the vibration actuator described in Japanese Laid-Open Patent Publication (Kokai) No. 2005-312264, the longitudinal direction of the urging engagement members and the axial direction of the shaft are parallel to each other, and the tension spiral springs are attached to the respective one ends of the two urging engagement members in the longitudinal direction. Therefore, even in the vibration actuator which is small in the amount of movement of the shaft, the size thereof in the axial direction which is the moving direction of the shaft becomes large.

As an example of solution of this problem, there has been proposed a vibration actuator 80 having a structure, shown in a cross-sectional view in FIG. 16. Note that an X-axis, a Y-axis, and a Z-axis, which are orthogonal to each other, are defined as shown in FIG. 16 for convenience of explanation. The vibration actuator 80 includes a first supporting body 86, a second supporting body 81, a contact body 82, a vibration element 83, a coil spring 84, a support shaft 85, a rotation shaft 87, a roller 88, a cushioning member 89, and a pressure transfer member 90. The first supporting body 86 is movably fitted on the support shaft 85 extending in the X-axis direction. The contact body 82 is a member receiving a frictional drive force from the vibration element 83 and extends in the X-axis direction. Respective opposite ends of the support shaft 85 and the contact body 82 in the X-axis direction are fixed to fixing means, not shown. The vibration element 83 is supported on the first supporting body 86 via the pressure transfer member 90 and the cushioning member 89 such that the vibration element 83 is brought into contact with the contact body 82.

The second supporting body 81 is mounted on the first supporting body 86 in a state rotatable about the rotation shaft 87 disposed in parallel to the X-axis. The roller 88 is disposed on the second supporting body 81 such that the roller 88 is rotatable about an axis parallel to the Y-axis, and is in contact with the contact body 82. One end of the second supporting body 81 on the positive Y-axis direction side (right side end, as viewed in FIG. 16) and one end of the first supporting body 86 on the positive Y-axis direction side (right side end, as viewed in FIG. 16) are pulled to each other by the coil spring 84 in the Z-axis direction. This makes it possible to bring the vibration element 83 into contact with the contact body 82 with a predetermined pressure force applied from the first supporting body 86 via the pressure transfer member 90 and the cushioning member 89. Here, felt, for example, is used for the cushioning member 89, and the cushioning member 89 serves to uniformly apply the pressure force to the vibration element 83.

When vibration is excited in the vibration element 83 to thereby generate a frictional drive force acting between the vibration element 83 and the contact body 82 in the X-axis direction, the support shaft 85 and the contact body 82 do not move, but the other members move in the X-axis direction in unison. According to the vibration actuator 80, the coil spring 84 is disposed at the end in the Y-axis direction, and hence it is possible to reduce the length of the structure in the X-axis direction except the support shaft 85 and the contact body 82.

However, in the vibration actuator 80, since the cushioning member 89 is compressed by receiving the pressure force, the thickness of the cushioning member 89 can be changed. Further, the vibration actuator 80 has a structure in which the vibration element 83 is rotatable about the support shaft 85. Therefore, if the cushioning member 89 is compressed such that the thickness thereof varies in the Y-axis direction, the vibration element 83 is tilted with respect to the contact body 82 (so-called rotation in the roll direction), and hence there is a possibility that desired driving performance cannot be obtained.

SUMMARY OF THE INVENTION

The present invention provides a vibration actuator that is reduced in the change of posture (angle) of a vibration element with respect to a contact body.

In a first aspect of the present invention, there is provided a vibration actuator including a vibration element unit and a contact body, which are movable relative to each other, wherein the vibration element unit comprises a first vibration element that is in contact with the contact body, a first holding member that holds the first vibration element, a base, a first supporting member that is fixed to the base, and movably supports the first holding member in a direction intersecting with a friction sliding surface of the contact body, which is in slide contact with the first vibration element, while maintaining the first vibration element in a predetermined posture with respect to the contact body, and an urging unit that is arranged on the base independently of the first supporting member and presses the first vibration element in a direction intersecting with the friction sliding surface of the contact body.

In a second aspect of the present invention, there is provided apparatus comprising the vibration actuator according to the first aspect of the invention, and a component driven by the vibration actuator.

According to the present invention, it is possible to provide the vibration actuator that is reduced in the change of posture (angle) of the vibration element with respect to the contact body.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
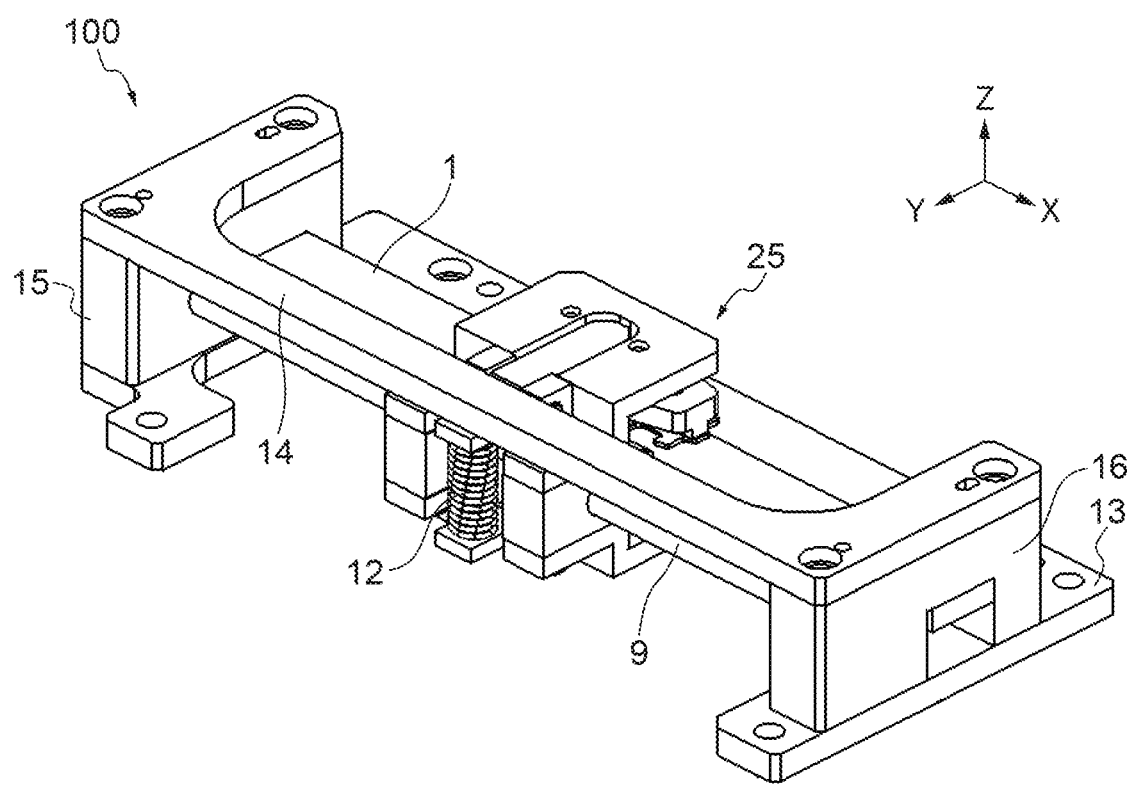
FIG. 1 is a perspective view showing the general arrangement of a vibration actuator according to a first embodiment.

FIG. 1 is a perspective view showing the general arrangement of a vibration actuator 100 according to a first embodiment. An X-axis, a Y-axis, and a Z-axis, which are orthogonal to each other, are defined as shown in FIG. 1 for convenience of explanation. As described hereinafter, the X-axis direction is a driving direction of a vibration element unit 25. The Z-axis direction is a direction orthogonal to (intersecting with) friction sliding surfaces of a contact body 1 in slide contact with two vibration elements 2, respectively. The Y-axis direction is a direction orthogonal to (intersecting with) the X-axis direction and the Z-axis direction.

The "contact body" refers to a member which is brought into contact with the vibration element, and is moved relative to the vibration element by vibration excited in the vibration element. The contact between the contact body and the vibration element is not limited to direct contact without any other member interposed between the contact body and the vibration element. The contact between the contact body and the vibration element may be indirect contact with another member interposed between the contact body and the vibration element, insofar as the contact body is moved relative to the vibration element by vibration excited in the vibration element. The "other member" is not limited to a member separate from the contact body and the vibration element (such as a high friction material formed of a sintered body). The "other member" may be a surface-treated portion of the contact body or the vibration element, formed e.g. by plating or nitriding.

The vibration actuator 100 includes the vibration element unit 25, the contact body 1, a support shaft 9, a bottom plate 13, a top plate 14, and side wall members 15 and 16. The side wall members 15 and 16 are erected and fixed to opposite ends of the bottom plate 13 in the X-axis direction, respectively. Respective opposite ends of the support shaft 9 and the contact body 1 are fixed to the side wall members 15 and 16 such that the longitudinal directions of the support shaft 9 and the contact body 1 are parallel to the X-axis. The top plate 14 is fixed to the side wall members 15 and 16 such that the top plate 14 and the bottom plate 13 sandwich the side wall members 15 and 16. The vibration element unit 25 is supported on the support shaft 9 such that the vibration element unit 25 is movable in the X-axis direction. The vibration actuator 100 has a structure in which the vibration element unit 25 is moved relative to the contact body 1 along the support shaft 9 in the X-axis direction.

Figure 2A:
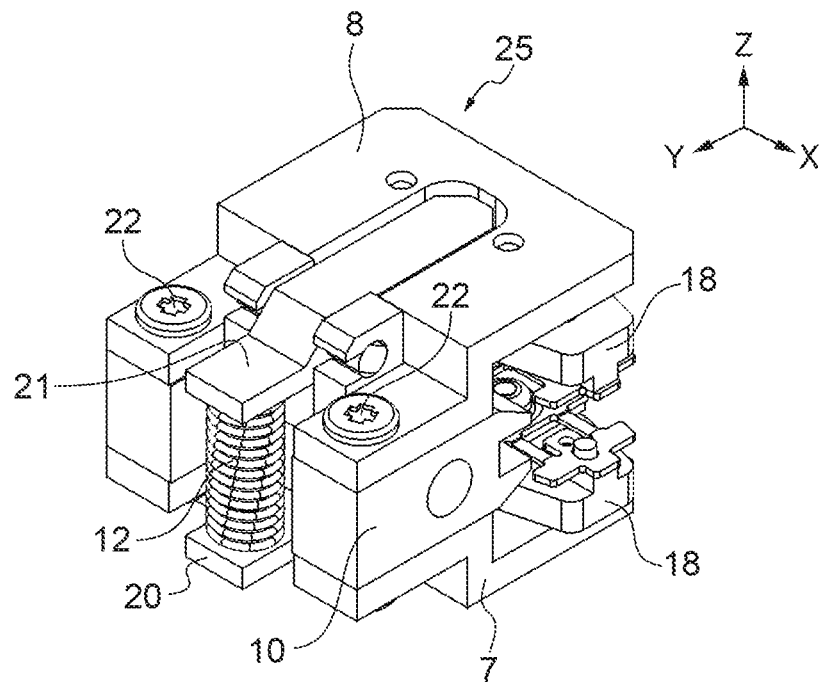
FIGS. 2A and 2B are a perspective view and a top view of a vibration element unit in the first embodiment, respectively.
Figure 2B:
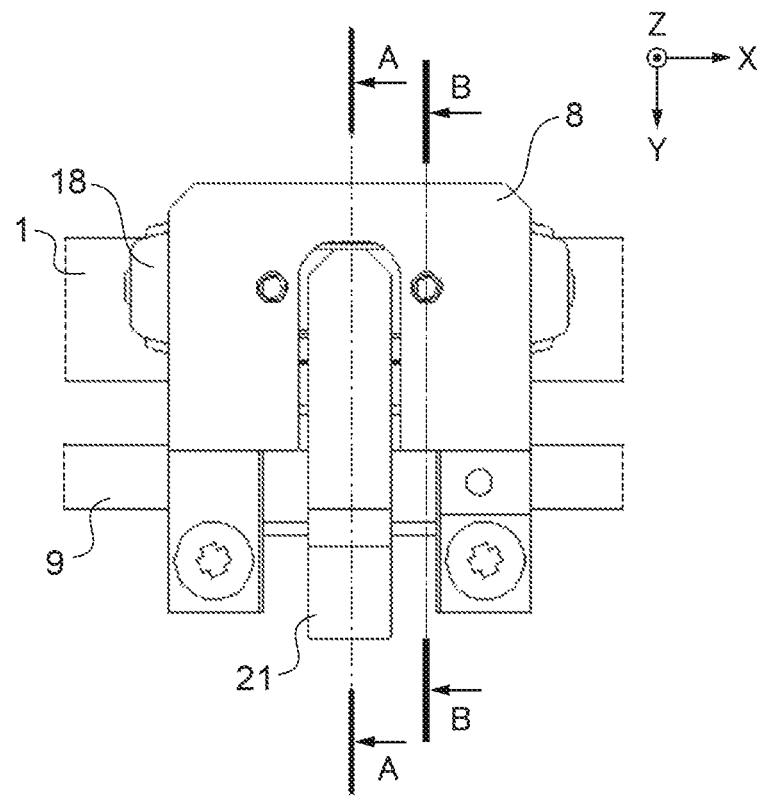
Figure 3A:
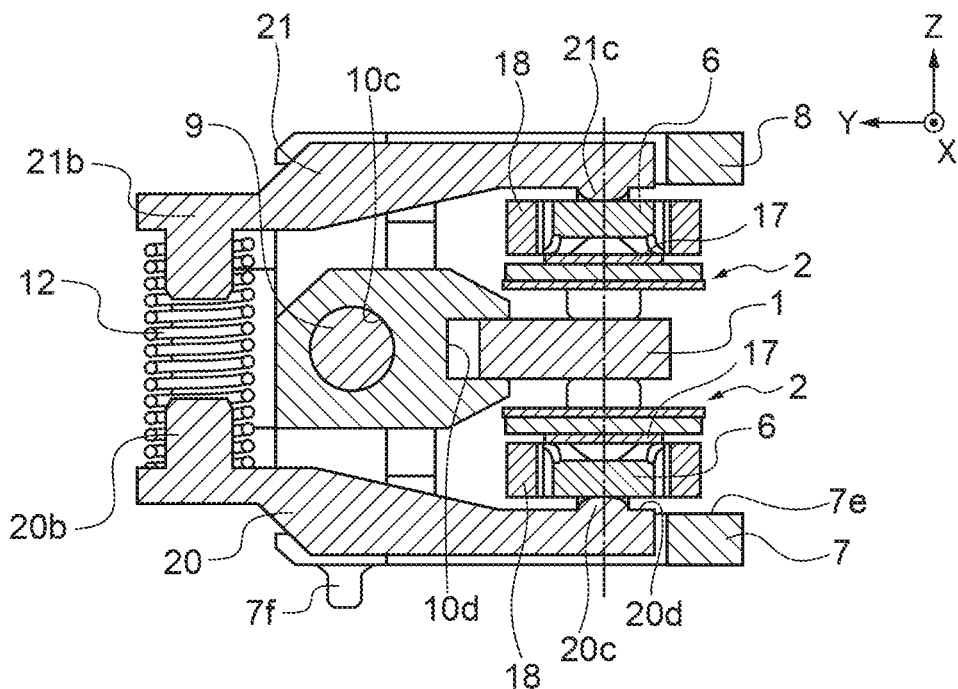
FIGS. 3A and 3B are cross-sectional views of the vibration element unit in the first embodiment.
Figure 3B:
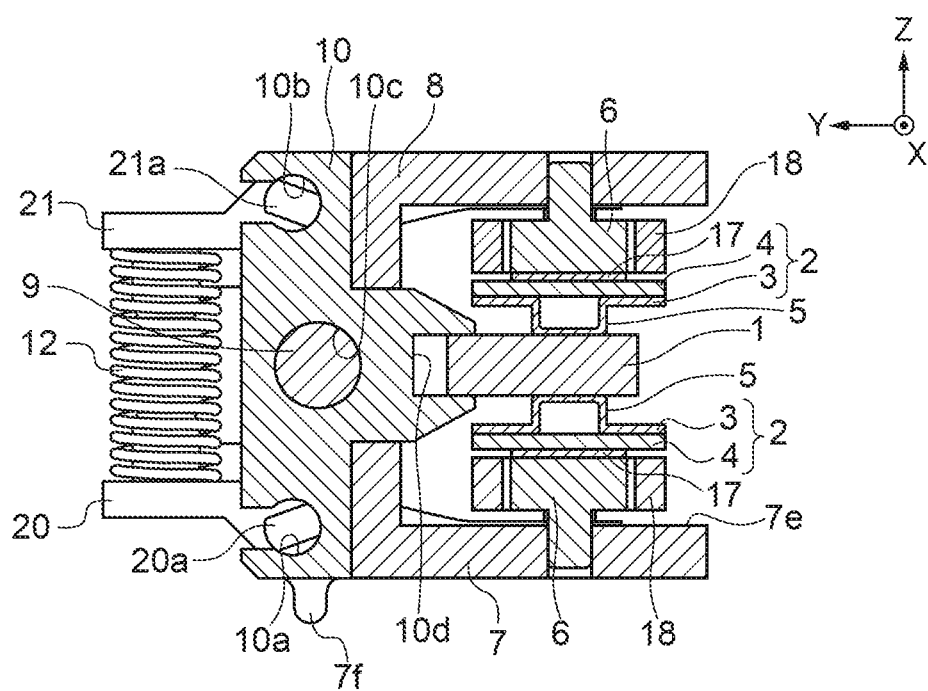

FIG. 2A is a perspective view showing the general arrangement of the vibration element unit 25. FIG. 2B is a top view of the vibration element unit 25. FIG. 3A is a cross-sectional view taken along A-A in FIG. 2B. FIG. 3B is a cross-sectional view taken along B-B in FIG. 2B.

The vibration element unit 25 includes the two vibration elements 2, two pressure transfer members 6, two holding members 18, a first supporting member 7, a second supporting member 8, a unit base 10 (base), a compression coil spring 12, and pressure levers 20 and 21.

Although details of the structure of each vibration element 2 will be described hereinafter, the vibration element 2 includes an elastic body 3 formed with protrusions 5, and a piezoelectric element 4 as an electromechanical energy conversion element bonded to the elastic body 3. In the vibration element unit 25, the two vibration elements 2 sandwich the contact body 1 in the Z-axis direction, and surfaces of the contact body 1, orthogonal to the Z-axis, form the friction sliding surfaces brought into slide contact with the respective protrusions 5 of the two vibration elements 2.

The two holding members 18 each hold one vibration element 2, the first supporting member 7 supports one of the holding members 18, and the second supporting member 8 supports the other of the holding members 18. The first supporting member 7 and the second supporting member 8 are fixed to the unit base 10 with screws 22. The unit base 10 has a circular hole 10c formed therethrough in the X-axis direction, and the support shaft 9 is slidably inserted through the circular hole 10c, whereby the unit base 10 is made movable along the support shaft 9 in the X-axis direction.

The pressure levers 20 and 21 are rotatably mounted on the unit base 10 independently of the first supporting member 7 and the second supporting member 8. More specifically, the respective X-axis direction side surfaces of the pressure levers 20 and 21 are formed with rotation shafts 20a and 21a each having a central axis parallel to the X-axis, and the rotation shafts 20a and 21a are slidably inserted through circular holes 10a and 10b formed in the unit base 10, respectively. With this, the pressure levers 20 and 21 each are supported on the unit base 10 such that they are rotatable about the central axis parallel to the X-axis.

The pressure levers 20 and 21 have respective spherical protrusions 20c and 21c, protruding toward the contact body 1, formed on one end portions thereof in the Y-axis direction (right end portions as viewed in FIG. 3A (on the negative Y-axis direction side)). The pressure levers 20 and 21 are brought into contact with flat surfaces of the pressure transfer members 6 via spherical surfaces of the spherical protrusions 20c and 21c thereof, respectively. The spherical protrusions 20c and 21c are in contact with the pressure transfer members 6 at respective positions each just on the reverse side of the center (midpoint position between the two protrusions 5 of each associated vibration element 2) of a vibration section V (described hereinafter with reference to FIG. 4) of the vibration element 2.

On the other end portions of the pressure levers 20 and 21 in the Y-axis direction (left end portions as viewed in FIG. 3 (on the positive Y-axis direction side)), the pressure lever 20 is formed with a cylindrical protrusion 20b protruding toward the pressure lever 21, and the pressure lever 21 is formed with a cylindrical protrusion 21b protruding toward the pressure lever 20. The compression coil spring 12 is an urging member held on the cylindrical protrusions 20b and 21b in a state having these inserted therein. The compression coil spring 12 urges the pressure lever 20 so as to rotate the pressure lever 20 about the rotation shaft 20a in a counter-clockwise direction as viewed in FIG. 3B. Further, the compression coil spring 12 urges the pressure lever 21 so as to rotate the pressure lever 21 about the rotation shaft 21a in a clockwise direction as viewed in FIG. 3B. Thus, the spherical protrusions 20c and 21c press the vibration element 2 supported by the first supporting member 7 and the vibration element 2 supported by the second supporting member 8 toward the contact body 1 via the pressure transfer members 6, respectively, and the two vibration elements 2 are held in a state pressed against the contact body 1.

As described above, the support shaft 9 is slidably inserted through the circular hole 10c of the unit base 10. Further, the unit base 10 is formed with a groove 10d having a groove width (width in the Z-axis direction) slightly larger than the thickness (thickness in the Z-axis direction) of the contact body 1 and the contact body 1 is slidably engaged in the groove 10d. Thus, the unit base 10 is held in a state in which its rotation about the support shaft 9 is restricted, and further, load (frictional resistance) applied when the vibration element unit 25 is moved along the support shaft 9 is held low. Therefore, the vibration element unit 25 can be smoothly moved along the support shaft 9 without changing its posture with respect to the contact body 1.

Figure 14:
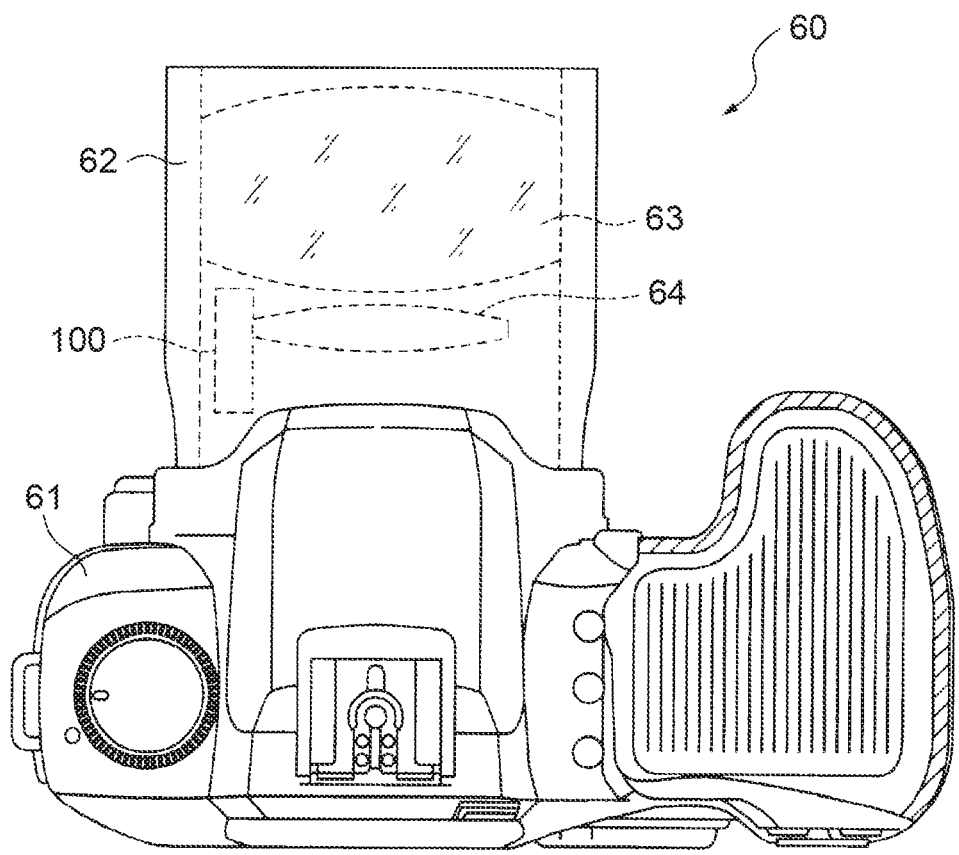
FIG. 14 is a top view showing the general arrangement of an image pickup apparatus equipped with the vibration actuator.

Note that the first supporting member 7 is formed with a connection portion 7f formed into a semispherical shape for connecting thereto an object to be driven, not shown (for example, a lens holding frame, not shown, which holds a focus adjustment lens 64 of an image pickup apparatus, described hereinafter with reference to FIG. 14). The shape of the connection portion 7f is not limited to the semispherical shape but can be designed into a shape which can be connected to an object to be driven. This connection portion may be provided on the second supporting member 8.

Figure 4:
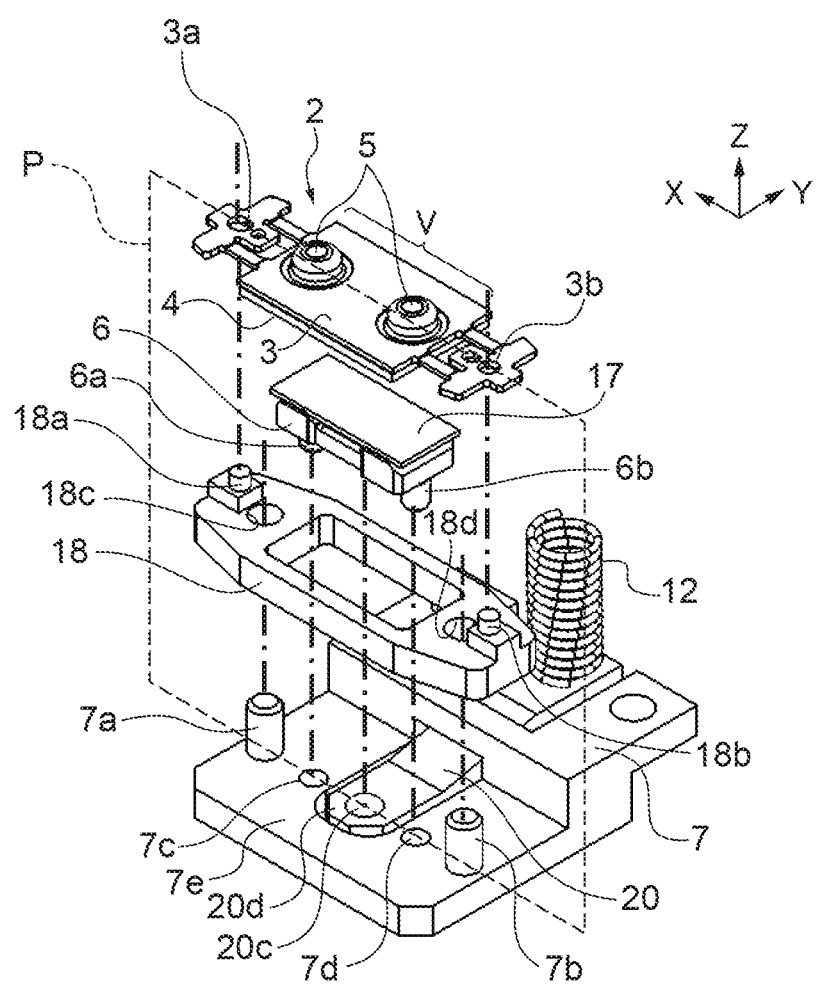
FIG. 4 is a partial exploded perspective view of the vibration element unit in the first embodiment.

Next, a structure for supporting each vibration element 2 will be described. FIG. 4 is a partial exploded perspective view of the vibration element unit 25, showing the arrangement in which the first supporting member 7 supports the vibration element 2 and the holding member 18. The elastic body 3 forming the vibration element 2 has a flat plate shape of which the longitudinal direction is the X-axis direction, and has a rectangular portion as a central portion thereof in the X-axis direction. One surface of the rectangular portion of the elastic body 3 is provided with the two protrusions 5 arranged at a predetermined interval in the X-axis direction, and the piezoelectric element 4 is bonded to the other surface of the rectangular portion of the elastic body 3. In the following description, part of the vibration element 2, including the rectangular portion of the elastic body 3, the protrusions 5, and the piezoelectric element 4, is referred to as the vibration section V of the vibration element 2.

Figure 5A:
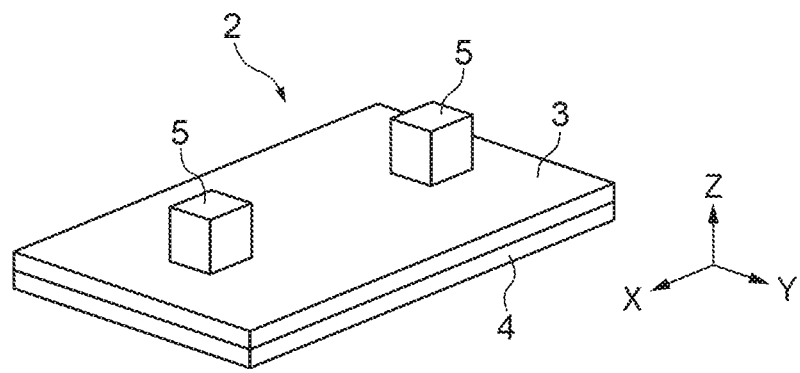
FIGS. 5A to 5C are views useful in explaining vibration modes of a vibration element included in the vibration element unit.
Figure 5B:
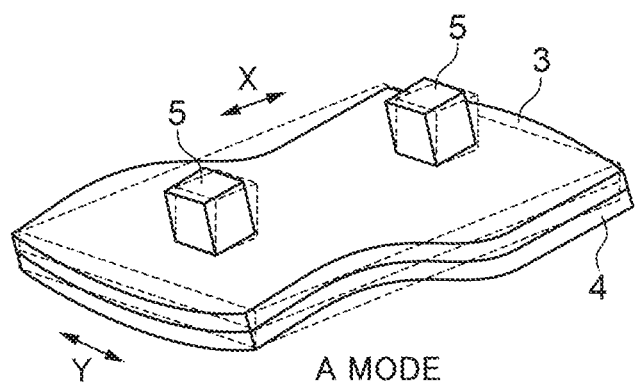

Here, the driving principle of the vibration element 2 will be described with reference to FIGS. 5A to 5C. FIG. 5A shows only the vibration section V of the vibration element 2. FIG. 5A is a perspective view showing the vibration element 2 in a simplified manner. FIG. 5B is a view useful in explaining a first vibration mode (hereinafter referred to as the "A mode") out of two bending vibration modes excited in the vibration element 2. The A mode is a mode of secondary bending vibration in the longitudinal direction (X-axis direction) of the vibration element 2, and has three node lines substantially parallel to the transverse direction (Y-axis direction) of the vibration element 2. Each protrusion 5 is disposed in the vicinity of a position corresponding to a node in the A mode of vibration and performs reciprocating motion in the X-axis direction when the A mode of vibration is excited in the vibration element 2.

Figure 5C:
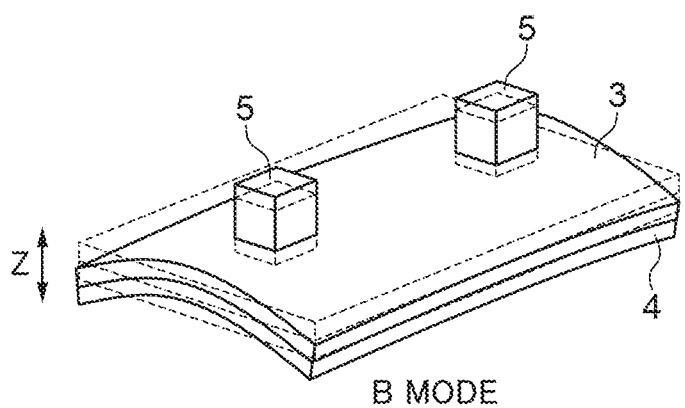

FIG. 5C is a view useful in explaining a second vibration mode (hereinafter referred to as the "B mode") out of the two bending vibration modes excited in the vibration element 2. The B mode is a mode of primary bending vibration in the transverse direction (Y-axis direction) of the vibration element 2, and has two node lines substantially parallel to the longitudinal direction (X-axis direction) of the vibration element 2. Each protrusion 5 is arranged in the vicinity of a position corresponding to an antinode in the B mode of vibration, and performs reciprocating motion in an axial direction (Z-axis direction) of the protrusion 5 when the B mode of vibration is excited in the vibration element 2.

Here, the vibration element 2 is configured such that the node lines in the A mode of vibration and the node lines in the B mode of vibration are substantially orthogonal to each other within an X-Y plane. Therefore, by exciting the A mode of vibration and the B mode of vibration with a predetermined phase difference, it is possible to cause the front ends of the protrusions 5 to perform elliptical motion within a Z-X plane to thereby apply the frictional driving force (thrust) in the X-axis direction to the contact body 1 (not shown in FIG. 5, see e.g. FIG. 2B). Note that a flexible circuit board, not shown, is bonded and connected to the piezoelectric element 4, and by supplying AC current to the piezoelectric element 4 via the flexible circuit board, it is possible to simultaneously excite the A mode of vibration and the B mode of vibration in the vibration element 2. The vibration element unit 25 is assembled in the vibration actuator 100 such that the directions of the X-axis, the Y-axis, the Z-axis of the vibration element 2 coincide with the directions of the X-axis, the Y-axis, the Z-axis of the vibration actuator 100, respectively.

The description with reference to FIG. 4 is resumed. The elastic body 3 is formed with two arm portions extending from the vibration section V of the vibration element 2 in the positive X-axis direction and the negative X-axis direction, respectively, and one of the arm portions is formed with a fitting hole 3a, and the other of them is formed with a fitting hole 3b. Protrusions 18a and 18b formed on opposite ends of the holding member 18 f in the X-axis direction are fitted in and bonded to the fitting holes 3a and 3b formed in the elastic body 3, respectively, whereby the vibration element 2 is held on the holding member 18 in a state positioned with respect to the same. Note that the method of fixing the vibration element 2 to the holding member 18 is not limited to the above-mentioned fitting and bonding method, but any other suitable method, such as welding, may be used.

The holding member 18 is formed therethrough with slide holes 18c and 18d in the Z-axis direction, and the first supporting member 7 is formed with columnar protruding portions 7a and 7b protruding in the Z-axis direction. The protruding portions 7a and 7b are slidably inserted in the slide holes 18c and 18d, respectively. With this, the holding member 18 is positioned in the X-axis direction and the Y-axis direction with respect to the first supporting member 7.

The first supporting member 7 is fixed to the unit base 10 with the screws 22 such that an upper surface 7e (surface of the first supporting member 7, opposed to the contact body 1) is made orthogonal to the Z-axis. Further, the protruding portions 7a and 7b are formed to protrude orthogonally to the upper surface 7e of the first supporting member 7. Therefore, the surfaces (upper and lower surfaces) of the holding member 18 orthogonal to the Z-axis are maintained in a parallel state to the surfaces of the first supporting member 7, including the upper surface 7e. Note that "the parallel state" used in the present description refers to a state which can be regarded as being substantially parallel, and it is not required to be strictly parallel. Further, "maintained in a parallel state" indicates that the state can be regarded as continuing to be a substantially parallel state.

The state in which the upper surface 7e of the first supporting member 7 is orthogonal to the Z-axis implies that the upper surface 7e is maintained in a parallel state to the friction sliding surfaces of the contact body 1. Therefore, the holding member 18 is supported by the first supporting member 7 such that the holding member 18 is movable in the Z-axis direction while maintaining the upper and lower surfaces thereof in a parallel state to the friction sliding surfaces of the contact body 1.

The pressure transfer member 6 and a cushioning member 17 for dispersing pressure force applied from the pressure transfer member 6 to the vibration element 2 are disposed between the vibration element 2 and the first supporting member 7. As the cushioning member 17, for example, felt can be used, and the cushioning member 17 is attached to a surface of the pressure transfer member 6, toward the piezoelectric element 4, by using e.g. adhesion or double-sided tape. The pressure transfer member 6 is provided with protruding portions 6a and 6b protruding toward the first supporting member 7 in the Z-axis direction, and the protruding portions 6a and 6b are slidably inserted in slide holes 7c and 7d formed through the first supporting member 7 in the Z-axis direction. Therefore, similar to the holding member 18, the pressure transfer member 6 is positioned in the X-axis direction and the Y-axis direction with respect to the first supporting member 7 and is arranged such that the pressure transfer member 6 is movable in the Z-axis direction.

The spherical protrusion 20c of the pressure lever 20 is brought into contact with a central portion of a surface of the pressure transfer member 6, opposite to the surface to which the cushioning member 17 is attached, to press the pressure transfer member 6 toward the vibration element 2. With this, the vibration element 2 is urged toward the contact body 1 with predetermined pressure force (brought into a pressurized state), whereby the pressure transfer member 6 is positioned in the Z-axis direction. Therefore, the position and posture of the holding member 18 holding the vibration element 2, in the X-axis direction and the Y-axis direction, are determined by the two protruding portions 7a and 7b, and the position of the same in the Z-axis direction is determined according to the position of the vibration element 2 which is pressed toward the contact body 1 by the pressure transfer member 6 and is thereby brought into contact with the contact body 1.

A distance between the pressure lever 20 and the pressure transfer member 6 in the Z-axis direction is affected by the dimensions of components, such as the vibration element 2, the cushioning member 17, the pressure transfer member 6, the first supporting member 7, the contact body 1, and the side wall members 15 and 16, and hence an accumulated error due to the dimensional accuracy of each component is produced. As a result, there is a possibility that the pressure lever 20 is tilted through several degrees from a parallel state of an upper surface 20d formed with the spherical protrusion 20c to the X-Y plane (see FIG. 3A). However, the pressure lever 20 can be rotated about the rotation shaft 20a, and further, the spherical protrusion 20c is in contact with part of the pressure transfer member 6, at a location corresponding to just on the reverse side of the midpoint position between the two protrusions 5 of the associated vibration element 2. For this reason, even when the pressure lever 20 is tilted as mentioned above, a force which tilts the pressure transfer member 6 about an axis parallel to the X-axis is prevented from acting from the pressure lever 20 on the pressure transfer member 6.

In the above-described arrangement, it is understood that the components of the vibration element unit 25 on the side toward the first supporting member 7 have the following first to fourth portions arranged within a plane P appearing in FIG. 4, which is orthogonal to the friction sliding surfaces of the contact body 1 and is parallel to the support shaft 9. The first portion refers to the protruding portions 7a and 7b of the first supporting member 7, and the second portion refers to the slide holes 18c and 18d of the holding member 18. The third portion refers to contact portions of the protrusions 5 of the vibration element 2, in contact with the contact body 1, and the fourth portion refers to the contact portion between the pressure transfer member 6 and the spherical protrusion 20c of the pressure lever 20. In other words, the slide portions between the first supporting member 7 and the holding member 18 in the Z-axis direction, the contact portions of the vibration element 2 in contact with the contact body 1, and the pressure applying portion which presses the vibration element 2 against the contact body 1 are arranged on the same plane P, and hence moment acting on the vibration element 2 about an axis parallel to the X-axis is less liable to be generated. Therefore, the vibration element 2 is difficult to rotate about the axis parallel to the X-axis to be brought into a tilted state with respect to the contact body 1, and it is possible to maintain the surface of the elastic body 3 (surface of the rectangular portion of the elastic body 3) in the vibration section V of the vibration element 2 and the friction sliding surfaces of the contact body 1 in the parallel state.

The components of the vibration element unit 25 on the side toward the second supporting member 8 are arranged symmetrical to the components on the side toward the first supporting member 7 with respect to the Z-axis direction. Therefore, although detailed description is omitted, a force which tilts the pressure transfer member 6 about an axis parallel to the X-axis is prevented from acting from the pressure lever 21 on the pressure transfer member 6. Further, also in the arrangement on the side toward the second supporting member 8, the slide portions of the holding member 18 in the Z-axis direction, the contact portions of the vibration element 2 in contact with the contact body 1, and the pressure applying portion which presses the vibration element 2 against the contact body 1 are arranged on the same plane P. Therefore, also in the arrangement on the side toward the second supporting member 8, similar to the side toward the first supporting member 7, moment acting on the vibration element 2 about an axis parallel to the X-axis is less liable to be generated. In other words, also in the arrangement on the side toward the second supporting member 8, the vibration element 2 is difficult to rotate about the axis parallel to the X-axis to be brought into a tilted state with respect to the contact body 1, and therefore, it is possible to maintain the surface of the elastic body 3 in the vibration section V of the vibration element 2 and the friction sliding surfaces of the contact body 1 in the parallel state.

Figure 16:
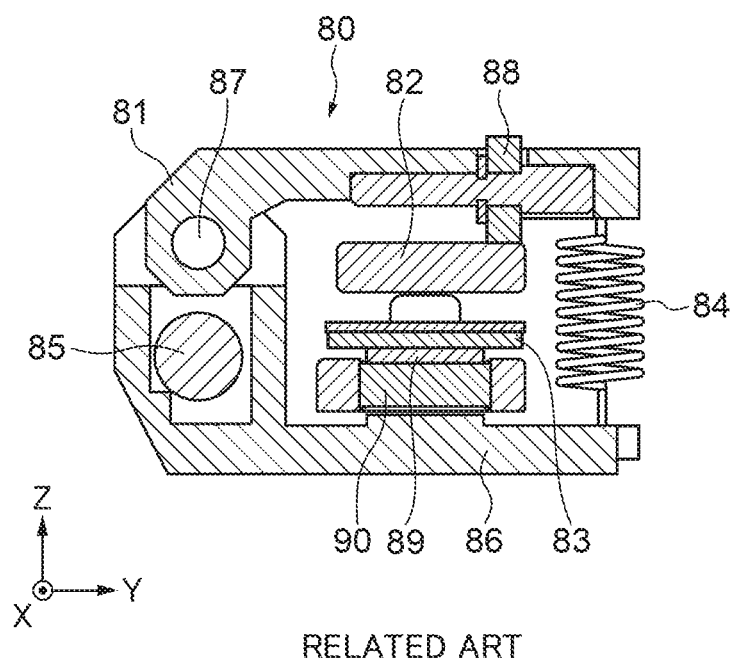
FIG. 16 is a side view showing a structure of a known vibration actuator.

Now, a comparison is made between the structure of the vibration element unit 25 of the present embodiment and that of the conventional vibration actuator 80, shown in FIG. 16. In the vibration actuator 80, when due to long-term use, compression of the cushioning member 89 by the pressure force results in reduced thickness thereof, there is a possibility that the cushioning member 89 becomes different in thicknesses between the positive Y-axis direction side and the negative Y-axis direction side due to the urging force applied by the tension coil spring 84. In this case, the frictional drive force applied to the contact body 82 by the vibration element 83 includes a Y-axis direction component, and a Z-axis direction component contributing to the relative movement between the vibration element 83 and the contact body 1 is reduced, which causes e.g. lowering of the use efficiency of the frictional drive force. On the other hand, in the vibration actuator 100, it is possible to maintain the surface of the elastic body 3 in the vibration section V of the vibration element 2 in a parallel state to the friction sliding surfaces of the contact body 1. Therefore, even when the cushioning member 17 is compressed, a difference in thickness is less liable to be generated between the positive Y-axis direction side and the negative Y-axis direction side, and as a result, lowering of the use efficiency in the long-term use is reduced.

As described above, in the vibration actuator 100, it is possible to maintain the surface of the elastic body 3 in the vibration section V of each of the two vibration elements 2 of the vibration element unit 25 and the friction sliding surfaces of the contact body 1 in the parallel state. This enables the vibration actuator 100 to be driven while exploiting the full potential thereof over a long term.

Although the above description has been given of the arrangement in which the contact body 1 is fixed and the vibration element unit 25 is movable, the vibration actuator 100 can be configured such that the vibration element unit 25 is fixed and the contact body 1 is movable. Further, although the vibration element unit 25 is combined with the contact body 1 having a linear shape, the shape of the contact body 1 is not limited to the linear shape.

Figure 6:
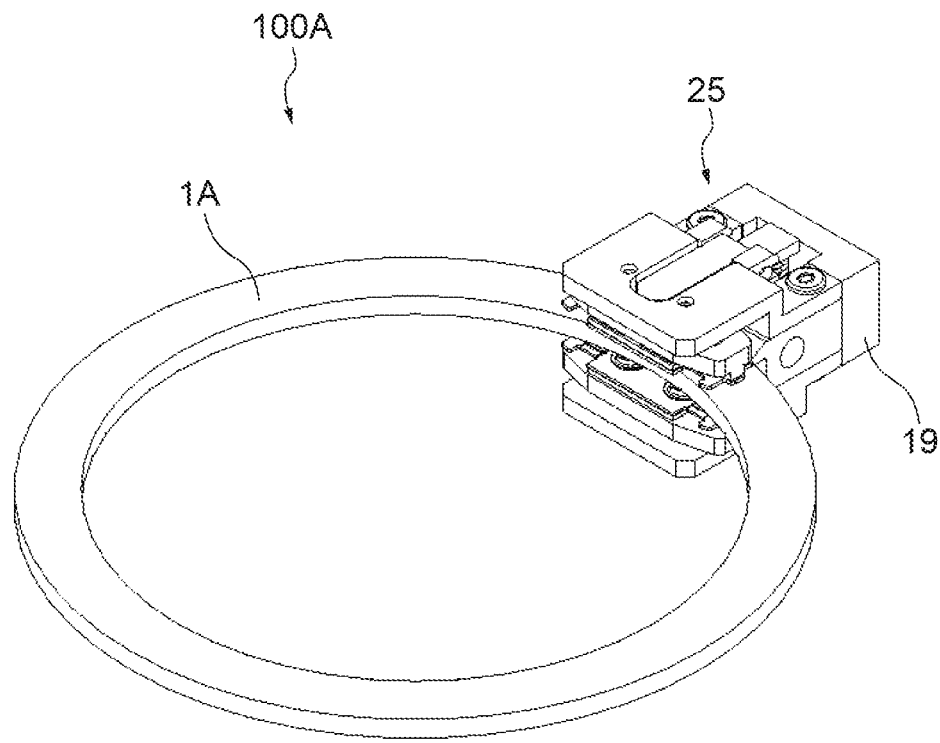
FIG. 6 is a perspective view showing the general arrangement of a vibration actuator as a variation of the first embodiment.

FIG. 6 is a perspective view showing the general arrangement of a vibration actuator 100A as a variation of the first embodiment, which is formed by combining a contact body 1A having an annular shape and the vibration element unit 25. The contact body 1A having an annular shape is arranged such that the contact body 1A is rotatable in a circumferential direction with respect to a guide, not shown. The vibration element unit 25 is fixed to a device frame 19 and the like such that two surfaces of the contact body 1A, parallel to a radial direction, each form a friction sliding surface with respect to the vibration element unit 25. In the vibration actuator 100A, it is possible to rotate the contact body 1A in the circumferential direction by driving the two vibration elements 2 to cause the frictional drive force to act in the circumferential direction of the contact body 1A (tangential direction of the circumference). Note that the structure can be configured such that the contact body 1A is fixed and the vibration element unit 25 is movable along the circumference of the contact body 1A.

Figure 7:
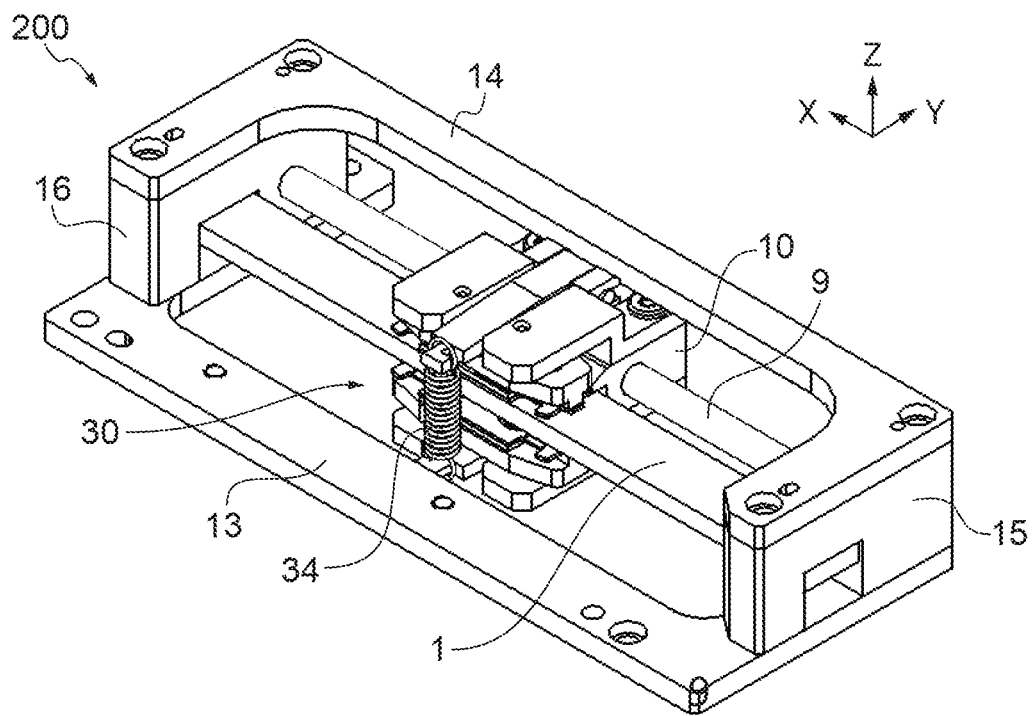
FIG. 7 is a perspective view showing the general arrangement of a vibration actuator according to a second embodiment.

Next, a description will be given of a second embodiment of the present invention. FIG. 7 is a perspective view showing the general arrangement of a vibration actuator 200 according to the second embodiment. Note that some of the component elements of the vibration actuator 200, which are substantially the same in function as those of the vibration actuator 100, are denoted by the same reference numerals, and redundant description is omitted.

The vibration actuator 200 includes a vibration element unit 30, the contact body 1, the support shaft 9, the bottom plate 13, the top plate 14, and the side wall members 15 and 16. The vibration element unit 30 is supported on the support shaft 9 such that the vibration element unit 30 is movable in the X-axis direction. The vibration actuator 200 has a structure in which the vibration element unit 30 moves relative to the contact body 1 along the support shaft 9 in the X-axis direction.

Figure 8A:
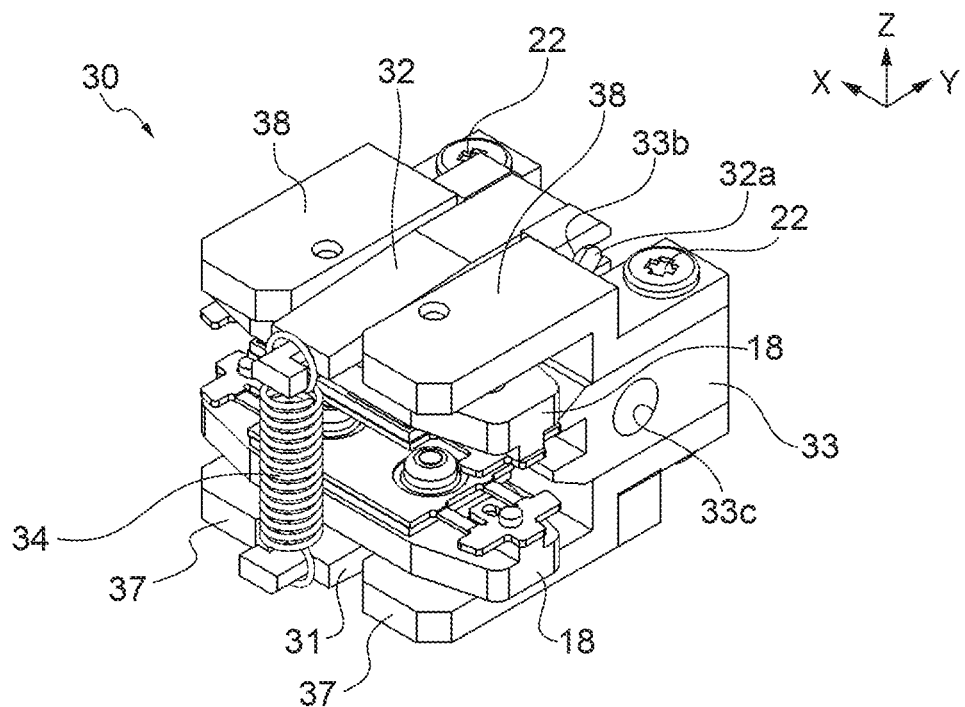
FIGS. 8A and 8B are a perspective view and a cross-sectional view of a vibration element unit in the second embodiment, respectively.
Figure 8B:
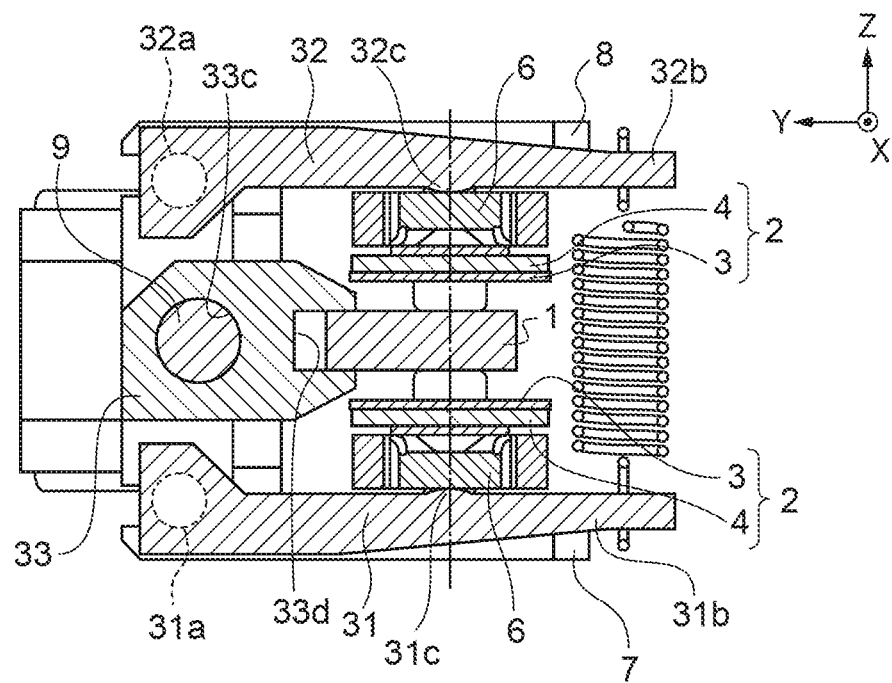
Figure 9:
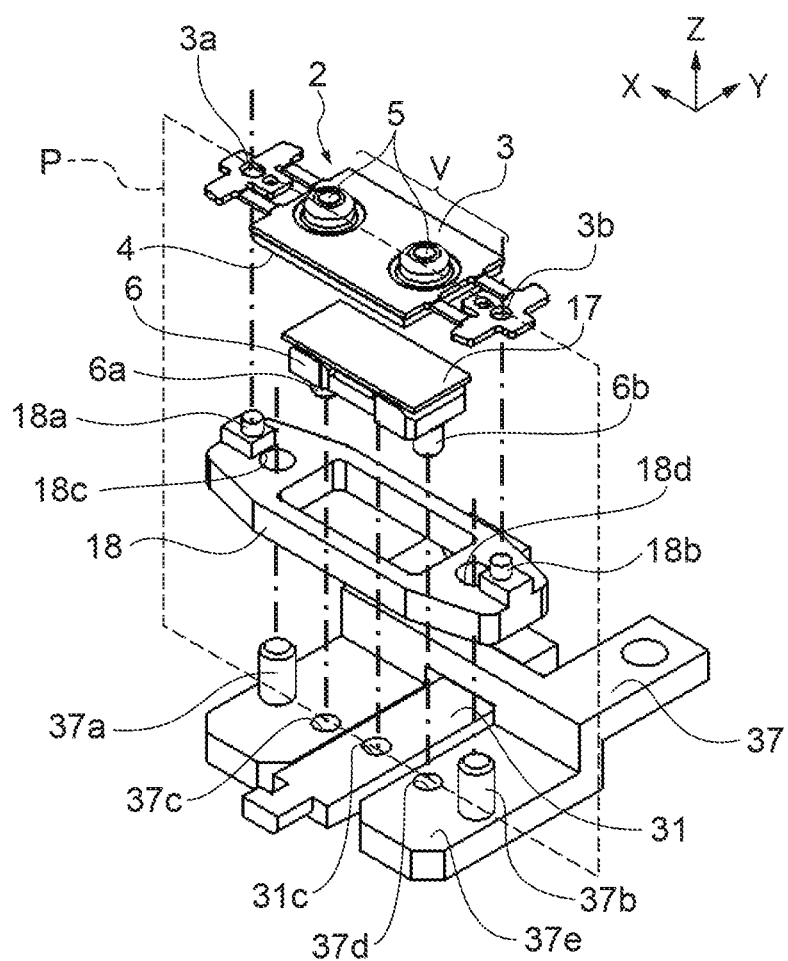
FIG. 9 is a partial exploded perspective view of the vibration element unit of the second embodiment.

FIG. 8A is a perspective view showing the general arrangement of the vibration element unit 30. FIG. 8B is a cross-sectional view of the vibration element unit 30, showing a cross-section orthogonal to the X-axis, which is cut at the center of the vibration element unit 30 in the X-axis direction. FIG. 9 is a partial exploded perspective view of the vibration element unit 30, showing the arrangement in which a first supporting member 37 supports an associated one of the vibration elements 2 and the holding member 18.

The vibration element unit 30 includes the two vibration elements 2, the two pressure transfer members 6, the two holding members 18, the first supporting member 37, a second supporting member 38, pressure levers 31 and 32, a unit base 33 (base), and a tension coil spring 34. Although in the vibration element unit 25 of the first embodiment, the compression coil spring 12 is used to urge the pressure levers 20 and 21, in the vibration element unit 30, the tension coil spring 34 is used to urge the pressure levers 31 and 32. Note that it is also possible to use an elastic member, such as rubber, in place of the tension coil spring 34.

The support shaft 9 is slidably inserted through a circular hole 33c formed through the unit base 33 in the X-axis direction. Further, the contact body 1 is slidably engaged with a groove 33d formed in the unit base 33. With this, the unit base 33 is movable along the support shaft 9 in the X-axis direction in a state in which its rotation about the support shaft 9 is restricted.

The structure of the vibration elements 2, the pressure transfer members 6, the cushioning members 17, and the holding members 18, and the arrangement of these members are the same as those described in the first embodiment, and hence description thereof is omitted. The first supporting member 37 positions the holding member 18 in the X-axis direction and the Y-axis direction and supports the same such that it is slidable in the Z-axis direction. Compared with the first supporting member 7 as a component of the vibration element unit 25 described in the first embodiment, the structure of the first supporting member 37 is different in shape because of the arrangement of the pressure lever 31 and the tension coil spring 34, but is basically the same. More specifically, the first supporting member 37 is fixed to the unit base 33 with the screws 22 such that an upper surface 37e (see FIG. 9) is orthogonal to the Z-axis (parallel to the friction sliding surfaces of the contact body 1). Protruding portions 37a and 37b provided on the upper surface 37e of the first supporting member 37 such that the protruding portions 37a and 37b protrude in the Z-axis direction are slidably inserted in the slide holes 18c and 18d, respectively, formed through the holding member 18 holding the vibration element 2 associated therewith, in the Z-axis direction. The structure in which the second supporting member 38 positions the holding member 18 in the X-axis direction and Y-axis direction, and also supports the same such that it is slidable in the Z-axis direction corresponds to the structure in which the first supporting member 37 supports the holding member 18, and hence description thereof is omitted.

The pressure levers 31 and 32 are respectively formed with rotation shafts 31a and 32a parallel to the X-axis, and the unit base 33 is formed with circular holes 33a (not shown) and 33b (see FIG. 8A), through which the rotation shafts 31a and 32a can be inserted and fitted, respectively. The pressure levers 31 and 32 are rotatably supported on the unit base 33 by inserting the rotation shafts 31a and 32a through the circular holes 33a and 33b, respectively. Further, the pressure levers 31 and 32 are respectively formed with spherical protrusions 31c and 32c at respective locations corresponding to the protrusions 5 of the vibration element 2 in the Y-axis direction, and the spherical protrusions 31c and 32c are in contact with the pressure transfer member 6. Further, the tension coil spring 34 is suspended between end portions 31b and 32b of the pressure levers 31 and 32, opposite from end portions of the same in the Y-axis direction, through which the rotation shafts 31a and 32a extend, respectively. The spring force of the tension coil spring 34 generates moment acting on the pressure lever 31 about the rotation shaft 31a in the counterclockwise direction, as viewed in FIG. 8B, and the spherical protrusion 31c applies the pressure force to one of the pressure transfer members 6. Similarly, the spring force of the tension coil spring 34 generates moment acting on the pressure lever 32 about the rotation shaft 32a in the clockwise direction, as viewed in FIG. 8B, and the spherical protrusion 32c applies the pressure force to the other of the pressure transfer members 6.

The structure in which the pressure transfer member 6 is positioned in the X-axis direction and the Y-axis direction and is supported by the first supporting member 37 such that the pressure transfer member 6 is slidable in the Z-axis direction is the same as the structure in which the first supporting member 7 supports the pressure transfer member 6 of the vibration element unit 25, described in the first embodiment. That is, the protruding portions 6a and 6b formed on the pressure transfer member 6 such that they protrude toward the first supporting member 37 are slidably inserted in slide holes 37c and 37d formed through the first supporting member 37 in the Z-axis direction. Note that the structure in which the second supporting member 38 positions the pressure transfer member 6 in the X-axis direction and Y-axis direction and supports the same such that it is slidable in the Z-axis direction corresponds to the structure in which the first supporting member 37 supports the pressure transfer member 6, and hence description thereof is omitted.

Therefore, the vibration sections V of the vibration elements 2, supported by the first supporting member 37 and the second supporting member 38 via the holding members 18, respectively, receive the pressure force applied from the pressure levers 31 and 32 to the pressure transfer members 6, and are maintained in the state pressed against the contact body 1. At this time, the distances from the rotation shafts 31a and 32a of the pressure levers 31 and 32 to the tension coil spring 34 are necessarily longer than the distances from the respective rotation shafts 31a and 32a of the pressure levers 31 and 32 to the respective vibration elements 2, and hence the spring force of the tension coil spring 34 is not required to be equal to or larger than the pressure force applied to the vibration elements 2. Further, the pressure transfer members 6 are in contact with the spherical protrusions 31c and 32c at respective locations just on the reverse side of the midpoint position between the two protrusions 5 of each associated vibration element 2, similar to the first embodiment, and hence the position of each pressure transfer member 6 in the Z-axis direction is determined by the pressure levers 31 and 32. The position of each pressure transfer member 6 in the Z-axis direction is thus determined, whereby the position of the vibration element 2 in the Z-axis direction is determined, so that the position of the holding member 18 in the Z-axis direction is also determined.

Further, similar to the vibration element unit 25 described in the first embodiment, in the vibration element unit 30, as shown in FIG. 9, the slide portions of the holding member 18 in the Z-axis direction, the contact portions of the vibration element 2 in contact with the contact body 1, and the pressure applying portion which presses the vibration element 2 against the contact body 1 are arranged on the same plane P. For this reason, moment acting on the vibration element 2 about an axis parallel to the X-axis is less liable to be generated. Therefore, the vibration element 2 is difficult to rotate about an axis parallel to the X-axis to be brought into a tilted state with respect to the contact body 1, and as a result, it is possible to maintain the surface of the elastic body 3 in the vibration section V of the vibration element 2 and the friction sliding surfaces of the contact body 1 in the parallel state. Similar to the vibration actuator 100 according to the first embodiment, the vibration actuator 200 can be driven while exploiting the full potential thereof over a long term.

Figure 10:
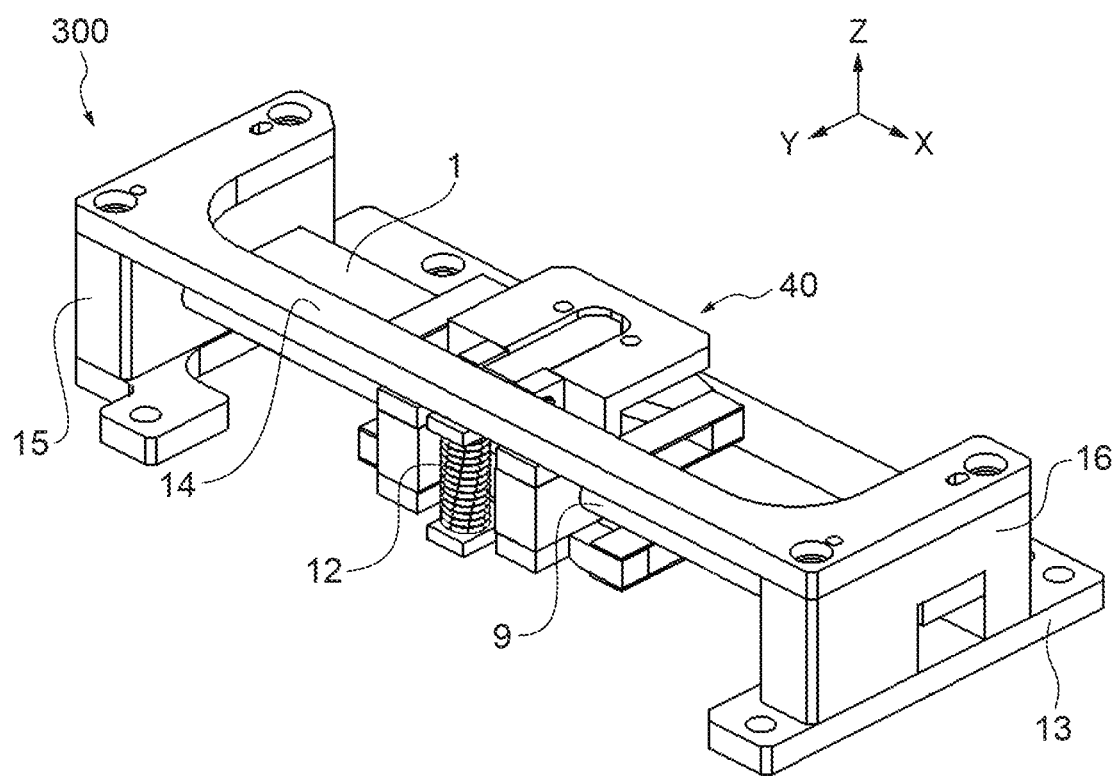
FIG. 10 is a perspective view showing the general arrangement of a vibration actuator according to a third embodiment.

Next, a description will be given of a third embodiment of the present invention. FIG. 10 is a perspective view showing the general arrangement of a vibration actuator 300 according to the third embodiment. Note that some of the component elements of the vibration actuator 300, which are substantially the same in function as those of the vibration actuator 100, are denoted by the same reference numerals, and redundant description is omitted. The vibration actuator 300 includes a vibration element unit 40, the contact body 1, the support shaft 9, the bottom plate 13, the top plate 14, and the side wall members 15 and 16. The vibration actuator 300 has a structure in which the vibration element unit 40 is supported on the support shaft 9 such that the vibration element unit 40 is slidable in the X-axis direction, whereby the vibration element unit 40 is movable relative to the contact body 1 along the support shaft 9 in the X-axis direction.

Figure 11A:
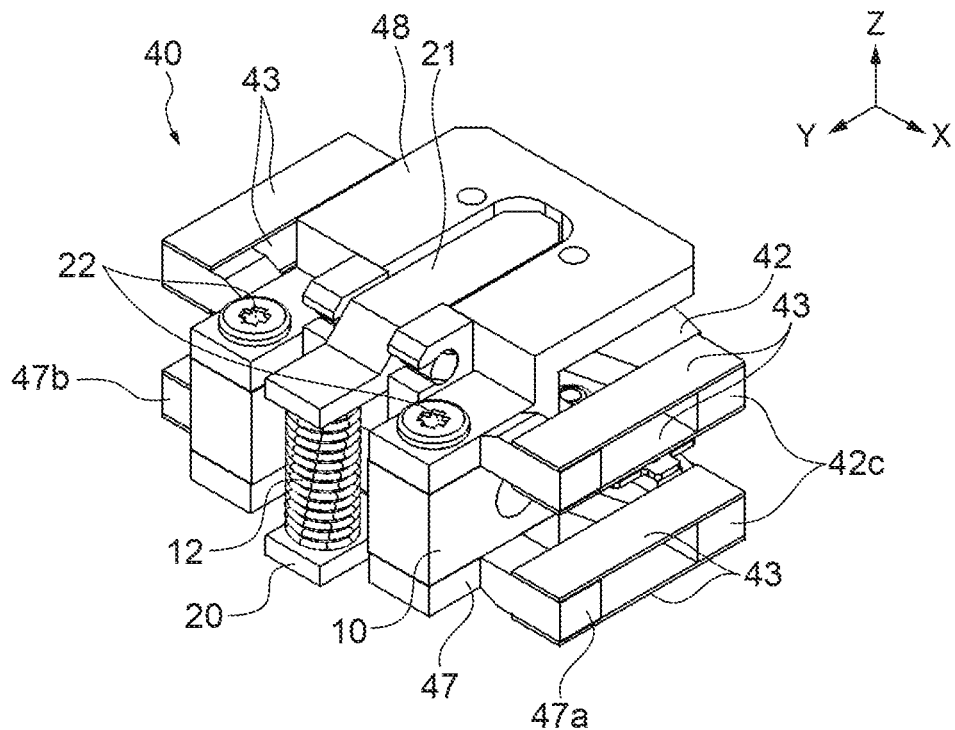
FIGS. 11A and 11B are a perspective view and a partial exploded perspective view of a vibration element unit of the third embodiment, respectively.
Figure 11B:
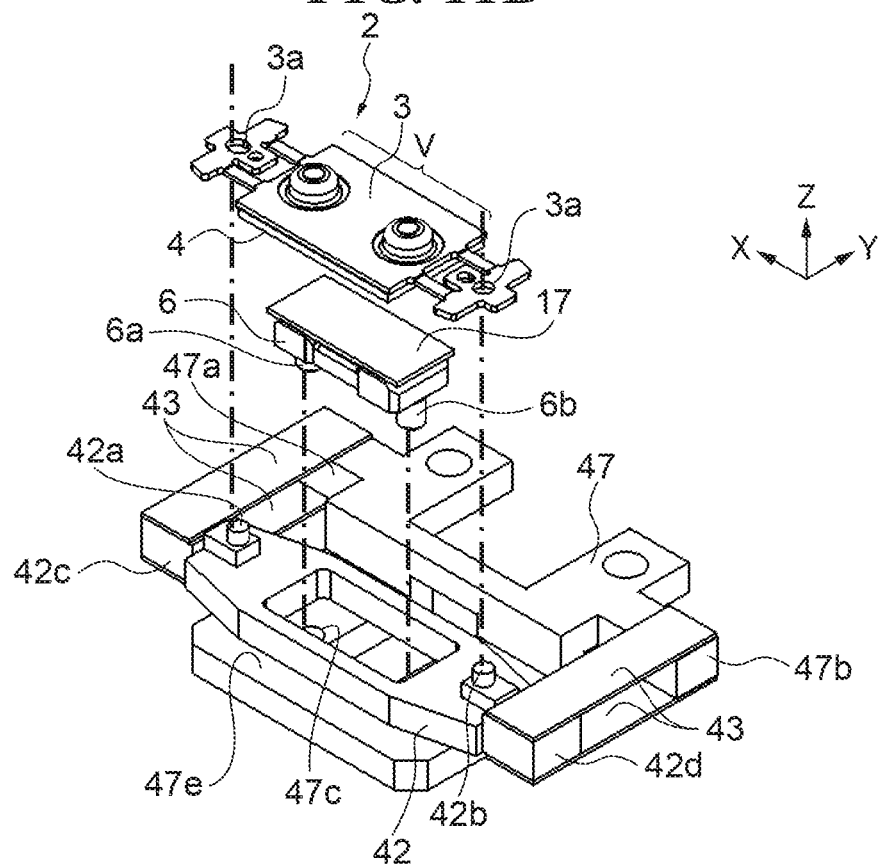

FIG. 11A is a perspective view showing the general arrangement of the vibration element unit 40. FIG. 11B is a partial exploded perspective view of the vibration element unit 40, showing the arrangement in which a first supporting member 47 holds a holding member 42 and the vibration element 2 associated therewith. The vibration element unit 40 includes the two vibration elements 2, the two pressure transfer members 6 to each of which the cushioning member 17 is attached, two holding members 42, the first supporting member 47, a second supporting member 48, the unit base 10, the pressure levers 20 and 21, and the compression coil spring 12. The vibration element unit 40 is the same as the vibration element unit 25 of the first embodiment in the structure of the vibration element 2 and the pressure transfer member 6, and how the pressure levers 20 and 21 and the compression coil spring 12 are arranged on the unit base 10, and hence description thereof is omitted.

The first supporting member 47 and the second supporting member 48 are fixed to the unit base 10 with the screws 22. The first supporting member 47 and the second supporting member 48 each support one holding member 42. Protrusions 42a and 42b formed on the holding member 42 are fitted in and bonded to the fitting holes 3a and 3b formed in the elastic body 3, respectively, whereby the vibration element 2 is held on the holding member 42 in a state positioned with respect to the same. The protruding portions 6a and 6b formed on the pressure transfer member 6 are slidably inserted in slide holes 47c and 47d (not shown) formed in an upper surface 47e of the first supporting member 47 such that the slide holes 47c and 47d extend through the first supporting member 47 in the Z-axis direction. With this, the pressure transfer member 6 is positioned in the X-axis direction and the Y-axis direction with respect to the first supporting member 47 and is movable in the Z-axis direction. Further, the spherical protrusion 20c of the pressure lever 20 is brought into contact with the central portion of a surface of the pressure transfer member 6, opposite from a surface to which the cushioning member 17 is attached, whereby the pressure transfer member 6 is urged by the pressure lever 20 and is positioned in the Z-axis direction.

In the first embodiment, the protruding portions 7a and 7b formed on the first supporting member 7 are slidably inserted in the slide holes 18c and 18d formed through the holding member 18, respectively, whereby the holding member 18 is positioned in the X-axis direction and the Y-axis direction and movably held in the Z-axis direction. In contrast, in the vibration element unit 40, at opposite ends thereof in the X-axis direction, each two flat springs 43, each having a rectangular shape, which are arranged in parallel to each other connect between the first supporting member 47 and the holding member 42 associated therewith, to thereby make the holding member 42 movable in the Z-axis direction. With the same arrangement as described above, the second supporting member 48 also supports the holding member 42 associated therewith, such that the holding member is movable in the Z-axis direction.

The structure in which the first supporting member 47 supports the vibration element 2 and the holding member 42, associated therewith, will be described below in detail. Opposite ends of the holding member 42 in the X-axis direction are formed with connection portions 42c and 42d each having a quadratic prism-shape, respectively, and opposite ends of the first supporting member 47 in the X-axis direction are also formed with connection portions 47a and 47b each having a quadratic prism-shape, which are configured to have the same thickness in the Z direction as the connection portions 42c and 42d. One of associated two of the flat springs 43 having a rectangular shape is fixed to an upper surface of the connection portion 42c and an upper surface of the connection portion 47a by bonding, double-sided tape, welding, or the like. Similarly, the other of the associated two of the flat springs 43 is also fixed to a lower surface of the connection portion 42c and a lower surface of the connection portion 47a. These two flat springs 43 are substantially the same in shape, thickness, and material (raw workpiece). As the material of the flat springs 43, a metallic material for flat springs, such as a phosphor bronze plate for springs and a stainless steel strip for springs, is suitable.

Since the connection portion 42c and the connection portion 47a are equal to each other in the thickness in the Z-axis direction, the two flat springs 43 are arranged in parallel to each other. Further, surfaces of the connection portion 42c and the connection portion 47a, opposed to each other in the Y-axis direction, are parallel to each other and also orthogonal to the Y-axis. Therefore, the two flat springs 43 are equal to each other in the length of a portion bridging between the connection portion 42c and the connection portion 47a.

Figure 12A:
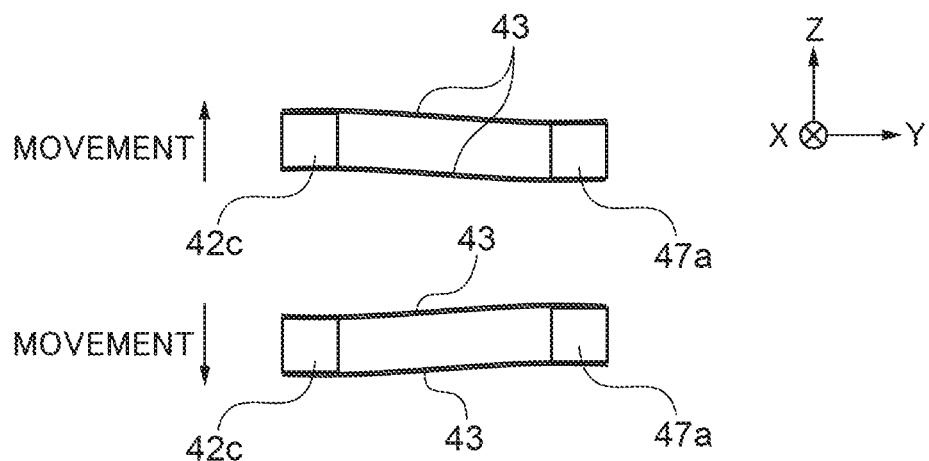
FIGS. 12A and 12B are schematic views useful in explaining structures for restricting movement of a holding member of the vibration element unit in the third embodiment, respectively.

FIG. 12A is a view schematically showing movement of the connection portion 42c of the holding member 42, the connection portion 47a of the first supporting member 47, and the flat springs 34. The connection portion 42d of the holding member 42 and the connection portion 47b of the first supporting member 47 are also connected by the same two flat springs 43, similar to the connection portion 42c of the holding member 42 and the connection portion 47a of the first supporting member 47. Therefore, the connection structure in which the holding member 42 and the first supporting member 47 are connected by the four flat springs 43 is symmetric in the X-axis direction.

By connecting the holding member 42 and the first supporting member 47 by using a pair of "parallel flat spring mechanisms" as described above, the rigidity in the directions other than the Z-axis direction is increased. As a result, when an external force is received, the holding member 42 is capable of parallel movement only in the Z-axis direction without being rotated about an axis parallel to the X-axis and an axis parallel to the Y-axis. Therefore, even when the holding member 42 moves in the Z-axis direction, the surface of the elastic body 3 in the vibration section V of the vibration element 2 and the friction sliding surfaces of the contact body 1 are maintained in the parallel state.

Also in the vibration element unit 40, the contact portions of the vibration element 2 in contact with the contact body 1, and the pressure applying portion which presses the vibration element 2 against the contact body 1 are arranged within a plane orthogonal to the friction sliding surfaces of the contact body 1 and also parallel to the support shaft 9, and hence moment acting on the vibration element 2 about an axis parallel to the X-axis is less liable to be generated. Therefore, the vibration element 2 is difficult to rotate about an axis parallel to the X-axis to be brought into a tilted state with respect to the contact body 1, and it is possible to maintain the surface of the elastic body 3 in the vibration section V of the vibration element 2 and the friction sliding surfaces of the contact body 1 in the parallel state. Note that the second supporting member 48 has a symmetric structure to the first supporting member 47 in the Z-axis direction, and therefore, the structure in which the second supporting member 48 supports the vibration element 2 and the holding member 42, associated therewith, is the same as the structure in which the first supporting member 47 supports the vibration element 2 and the holding member 42, associated therewith, and hence description thereof is omitted.

As described above, similar to the vibration element unit 25, the vibration element unit 40 also makes it possible to maintain the surface of the elastic body 3 in the vibration section V of the vibration element 2 and the friction sliding surfaces of the contact body 1 in the parallel state. With this, the vibration actuator 300 including the vibration element unit 40 can provide the same advantageous effects as provided by the vibration actuator 100 according to the first embodiment.

Incidentally, in the vibration element unit 40, the structure has been described in which the first supporting member 47 and the second supporting member 48 each support the holding member 42 associated therewith by using the parallel flat spring mechanism. However, this is not limitative. The connection method is not particularly limited insofar as the first supporting member 47 and the second supporting member 48 can each hold the holding member 42 such that the holding member 42 is movable only in the Z-axis direction. As an example of the connection method, a parallel link mechanism will be described with reference to FIG. 12B.

Figure 12B:
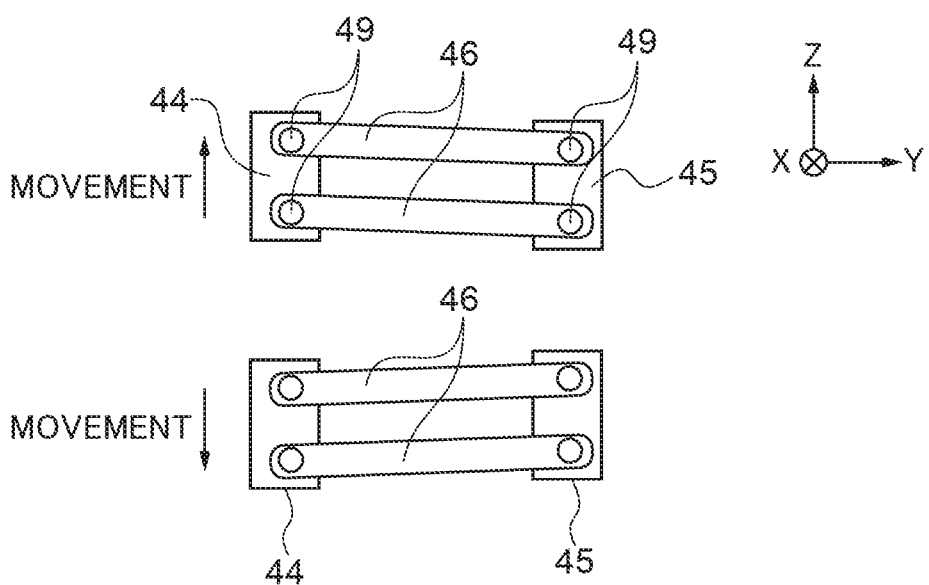

FIG. 12B is a schematic view showing a structure in which a holding member 44 and a supporting member 45 are connected by the parallel link mechanism, which corresponds to that shown in FIG. 12A. The holding member 44 and the supporting member 45 are connected by two connection members 46 having the same length. Opposite ends of each connection member 46 are rotatably mounted on the holding member 44 and the supporting member 45 by connection pins 49. A distance between the two connection pins 49 on the holding member 44 and a distance between the two connection pins 49 on the supporting member 45 are set to be equal to each other.

Similar to the connection structure using the parallel flat springs, this parallel link is provided as a pair of parallel links arranged at locations spaced from each other in the X-axis direction so as to form a symmetric structure in the X-axis direction. With this, when the holding member 44 vertically moves in the Z-axis direction, the holding member 44, the supporting member 45, and the two connection members 46 draw a changing parallelogram within a Y-Z plane. That is, the holding member 44 can move in parallel only in the Z-axis direction without being rotated about an axis parallel to the X-axis and an axis parallel to the Y-axis. Therefore, by using the parallel link mechanism shown in FIG. 12B, although illustration of the whole arrangement is omitted, it is possible to maintain the surface of the elastic body 3 in the vibration section V of the vibration element 2 held by the holding member 44 and the friction sliding surfaces of the contact body 1 in the parallel state.

Figure 13A:
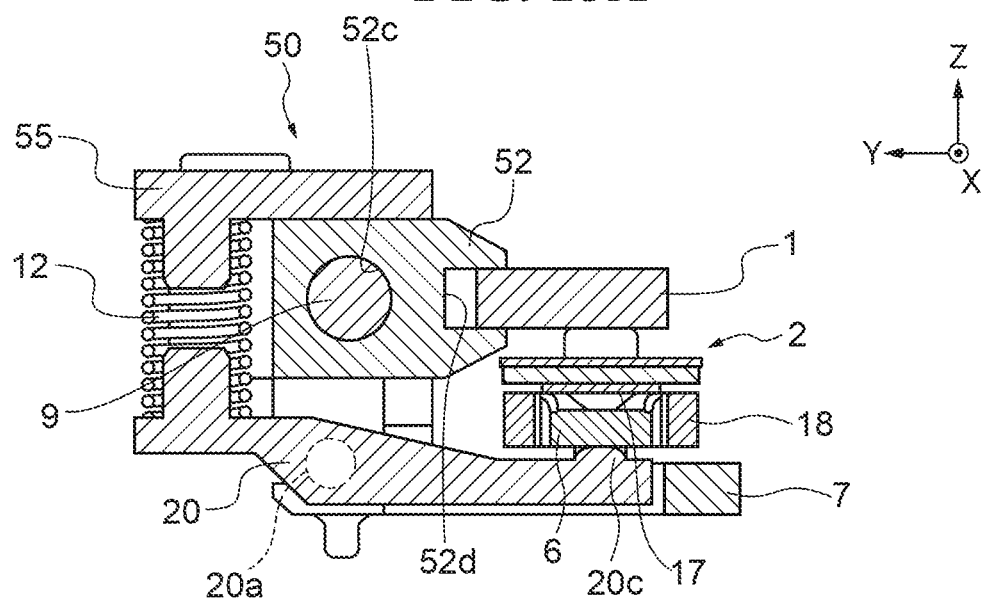
FIGS. 13A and 13B are a cross-sectional view and an exploded perspective view of a vibration element unit in a fourth embodiment, respectively.
Figure 13B:
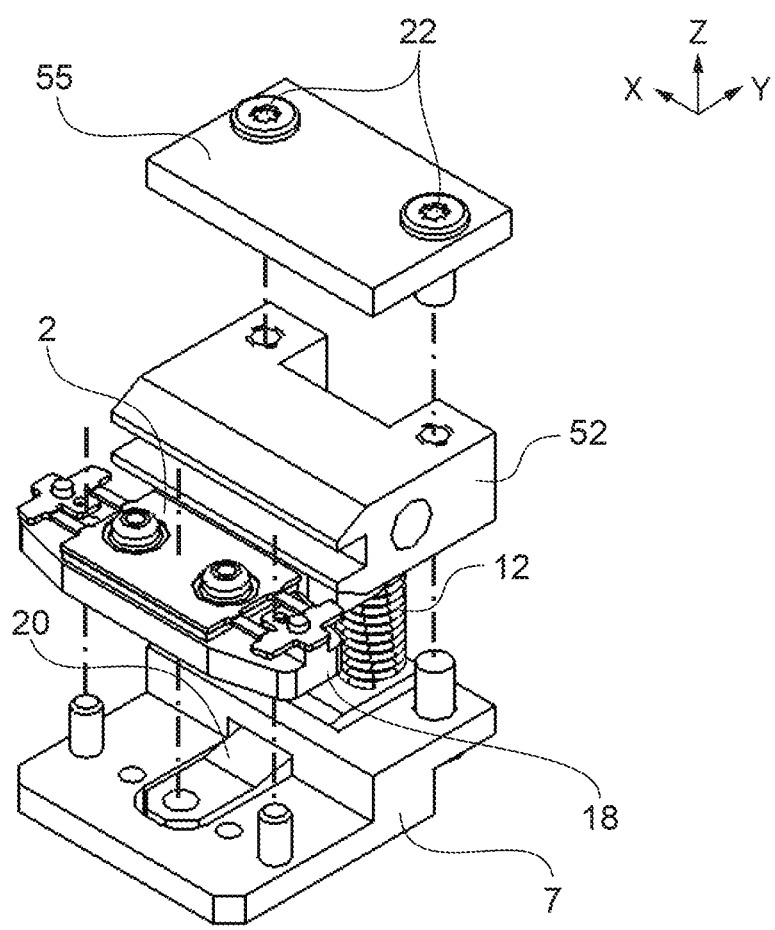

Next, a description will be given of a fourth embodiment of the present invention. FIG. 13A is a cross-sectional view showing the general arrangement of a vibration element unit 50, and showing a cross-section orthogonal to the X-axis, which is cut at the center of the vibration element unit 50 in the X-axis direction. FIG. 13B is an exploded perspective view of the vibration element unit 50. A vibration actuator including the vibration element unit 50 is realized by replacing the vibration element unit 25 of the vibration actuator 100 described in the first embodiment by the vibration element unit 50. Therefore, illustration of the whole arrangement of the vibration actuator including the vibration element unit 50 is omitted. Further, some of the component elements of the vibration element unit 50, which are substantially the same in function as those of vibration element unit 25 forming the vibration actuator 100, are denoted by the same reference numerals, and redundant description is omitted.

The vibration element unit 50 includes the vibration element 2, the compression coil spring 12, the cushioning member 17, the pressure transfer member 6, the holding member 18, the first supporting member 7, a unit base 52 (base), the pressure lever 20, and a plate 55. The unit base 52 has a circular hole 52c formed therethrough in the X-axis direction and the support shaft 9 is slidably inserted through the circular hole 52c, whereby the unit base 52 is movable along the supporting shat 9 in the X-axis direction. Further, the unit base 52 is formed with a groove 52d and the contact body 1 is slidably engaged in the groove 52d.

The first supporting member 7 and the plate 55 are each fixed to the unit base 52 with the screws 22. The plate 55 is a member provided in place of the second supporting member 8 of the vibration element unit 25 of the first embodiment. However, in the vibration element unit 50, the plate 55 is used as a member for arranging the compression coil spring 12 which applies the urging force for rotating the pressure lever 20 about the rotation shaft 20a in the counterclockwise direction, as viewed in FIG. 13A, to the pressure lever 20.

The method of fixing the vibration element 2 to the holding member 18, the method of supporting the holding member 18 by the first supporting member 7, and the structure for transferring the pressure force of the pressure lever 20 to the vibration element 2 via the cushioning member 17 and the pressure transfer member 6 are the same as those used by the vibration element unit 25 in the first embodiment, and hence description thereof is omitted. Similar to the vibration element unit 25 having the two vibration elements 2, the vibration element unit 50 having the one vibration element 2 as well makes it possible to maintain the surface of the elastic body 3 in the vibration section V of the vibration element 2 and the friction sliding surface of the contact body 1 in the parallel state.

Next, a description will be given of various apparatuses to which the vibration actuator 100 is applied. FIG. 14 is a top view showing the general arrangement of an image pickup apparatus 60 equipped with the vibration actuator 100. The image pickup apparatus 60 has an image pickup apparatus body 61 including an image pickup device (not shown) and a lens barrel 62 (photographic lens) which can be attached and removed to and from the image pickup apparatus body 61. The lens barrel 62 includes a plurality of lens groups 63, the focus adjustment lens 64, and the vibration actuator 100. The vibration element unit 25 of the vibration actuator 100 is connected to a lens holding frame, not shown, for holding the focus adjustment lens 64 such that the driving (moving) direction of the vibration element unit 25 coincides with the optical axis direction. By driving the vibration actuator 100, it is possible to focus on an object by driving the focus adjustment lens 64 connected to the vibration element unit 25 in the optical axis direction.

Note that in a case where a zoom lens is arranged in the lens barrel 62, the vibration actuator 100 can be used as a drive source for moving the zoom lens in the optical axis direction. Further, in a case where an image blur correction lens is arranged in the lens barrel 62, the vibration actuator 100 can be used as a drive source for driving the image blur correction lens within a plane orthogonal to the optical axis.

Figure 15:
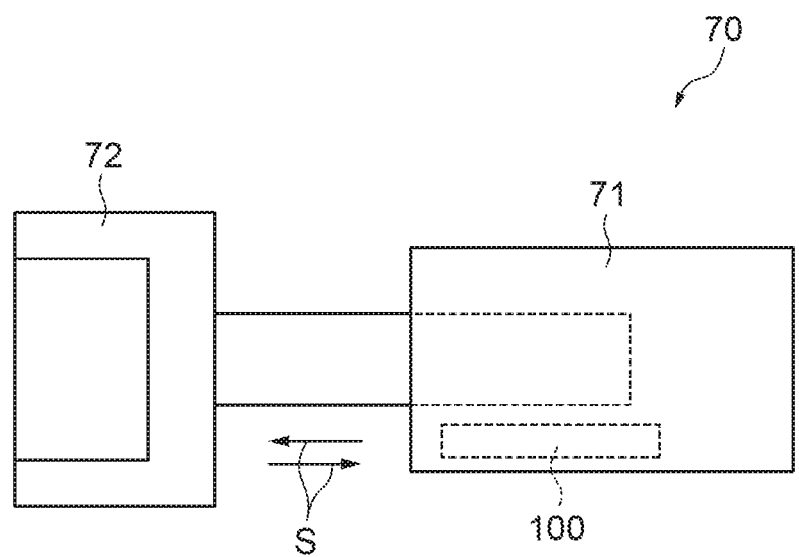
FIG. 15 is a view showing the schematic arrangement of a manipulator equipped with the vibration actuator.

FIG. 15 is a top view showing the general arrangement of a manipulator 70 equipped with the vibration actuator 100. The manipulator 70 includes a supporting section 71, the vibration actuator 100 arranged in the supporting section 71, and a hand section 72 slidably arranged in a direction indicated by an arrow S with respect to the supporting section 71. The hand section 72 is connected to the vibration element unit 25 of the vibration actuator 100. The vibration actuator 100 is used as a drive source for driving the hand section 72 in the direction S (for extending and compressing the hand section 72 in the direction S). Note that the vibration actuators in the above-described embodiments can be widely applied not only to the image pickup apparatus 60 and the manipulator 70 but also to various apparatuses including a component requiring positioning.

The present invention has been described heretofore based on the embodiments thereof. However, the present invention is not limited to these embodiments, but it is to be understood that the invention includes various forms within the scope of the gist of the present invention. Further, the embodiments of the present invention are described only by way of example, and it is possible to combine the embodiments on an as-needed basis.

For example, in the vibration element unit 25, the pressure levers 20 and 21 are formed with the spherical protrusions 20c and 21c, respectively, and the surfaces of the pressure transfer members 6, brought into contact with the spherical protrusions 20c and 21c, are each formed into the flat surface. This is not limitative, but inversely, a spherical protrusion may be formed on each pressure transfer member 6, and the surfaces of the pressure levers 20 and 21, brought into contact with the spherical protrusion, may be each formed into the flat surfaces. Similar modifications can also be realized in the other vibration element units.

Further, the arrangement of holes and protruding portions (protrusions) for slidably fitting components to each other is not limited to those in the above-described embodiments, but it is only required to form holes in one of the components, and protruding portions (protrusions) on the other. For example, although in the above description, the holding member 18 is formed with the slide holes 18c and 18d, and the first supporting member 7 is formed with the protruding portions 7a and 7b, the protruding portions may be formed on the holding member 18, and the slide holes may be formed in the first supporting member 7.

Further, in the vibration actuator 100, the engagement structure with respect to the one round-bar-shaped support shaft 9 and the contact body 1 having the rectangular cross-section is used to enable the vibration element unit 25 to linearly move while restricting rotation of the vibration element unit 25 about the support shaft 9 (about the X-axis). In place of this, for example, a polygonal column-shaped support shaft may be inserted through the unit base 10, whereby it is also possible to linearly move the vibration element unit 25 while restricting rotation about the X-axis only by using the one support shaft. Further, two round-bar-shaped support shafts arranged in parallel may be inserted through the unit base 10, whereby it is also possible to linearly move the vibration element unit 25 while restricting rotation about the X-axis. Alternatively, the vibration element unit 25 may be enabled to linearly move by using a mechanism which can smoothly move on a linear track, such as a linear guide, in place of the support shaft 9. Such configuration can also be applied to the vibration actuators 200, 300, and 400.

Similar to the above-descried modification of the vibration actuator 100 into the vibration actuator 100A, the arrangement in which the vibration element unit is fixed and the contact body is movable and modification of the shape and the like of the contact body can also be applied to the vibration actuators 200 and 300.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-188432 filed Oct. 3, 2018, which is hereby incorporated by reference herein in its entirety.

What is claimed is:

1. A vibration actuator including a vibration element unit and a contact body, which are movable relative to each other, wherein the vibration element unit comprises:
   a first vibration element that is in contact with the contact body;
   a first holding member that holds the first vibration element;
   a base;
   a first supporting member that is fixed to the base, and movably supports the first holding member in a direction intersecting with a friction sliding surface of the contact body, which is in slide contact with the first vibration element, while maintaining the first vibration element in a predetermined posture with respect to the contact body; and
   an urging unit that is arranged on the base independently of the first supporting member and presses the first vibration element in the direction intersecting with the friction sliding surface of the contact body.

2. The vibration actuator according to claim 1, wherein in the direction intersecting with the friction sliding surface of the contact body, a position of the first vibration element with respect to the contact body is determined by the urging unit, whereby a position of the first holding member is determined.

3. The vibration actuator according to claim 1, wherein the first vibration element comprises:
   an elastic body having a flat plate shape,
   at least one protrusion that is formed on one surface of the elastic body and is in contact with the contact body, and
   an electromechanical energy conversion element provided on the other surface of the elastic body.

4. The vibration actuator according to claim 1, wherein the first holding member is supported by the first supporting member through slidable fitting, in the direction intersecting with the friction sliding surface of the contact body, between a hole formed in one of the first supporting member and the first holding member and a protruding portion formed on the other.

5. The vibration actuator according to claim 1, wherein the first holding member is connected to the first supporting member by a parallel flat spring mechanism or a parallel link mechanism, whereby the first holding member is supported by the first supporting member.

6. The vibration actuator according to claim 1, wherein the urging unit comprises:

a first pressure lever that is rotatably arranged on the base, a first pressure transfer member that is arranged between the first vibration element and the first pressure lever and transfers pressure force applied from the first pressure lever to the first vibration element, and a first urging member that is arranged at an end portion of the first pressure lever and presses a contact portion of the first pressure lever in contact with the first pressure transfer member, toward the first vibration element.

7. The vibration actuator according to claim 6, wherein the first urging member is a compression coil spring or a tension coil spring.

8. The vibration actuator according to claim 6, wherein one of a surface of the first pressure transfer member in contact with the first pressure lever and a surface of the first pressure lever in contact with the first pressure transfer member is a flat surface and the other of the surfaces is a spherical surface.

9. The vibration actuator according to claim 6, wherein a slide portion between the first supporting member and the first holding member, a contact portion of the first vibration element in contact with the contact body, and a contact portion between the first pressure lever and the first pressure transfer member are arranged within a plane intersecting with the friction sliding surface of the contact body, and also parallel to a direction in which the vibration element unit and the contact body move relative to each other.

10. The vibration actuator according to claim 1, wherein the vibration element unit comprises:

a second vibration element that is arranged such that the second vibration element sandwiches the contact body with the first vibration element, a second holding member that holds the second vibration element, and a second supporting member that is fixed to the base, and movably supports the second holding member in the direction intersecting with the friction sliding surface of the contact body in slide contact with the second vibration element, while maintaining the second vibration element in a predetermined posture with respect to the contact body, and wherein the urging unit comprises:

a second pressure lever that is rotatably arranged on the base, a second pressure transfer member that is arranged between the second vibration element and the second pressure lever, and transfers pressure force applied from the second pressure lever to the second vibration element, and a second urging member that is arranged at an end portion of the second pressure lever, and presses a contact portion of the second pressure lever in contact with the second pressure transfer member, toward the second vibration element.

11. The vibration actuator according to claim 10, wherein the second urging member is a compression coil spring or a tension coil spring.

12. The vibration actuator according to claim 10, wherein the second vibration element comprises:

an elastic body having a flat plate shape, at least one protrusion that is formed on one surface of the elastic body and is in contact with the contact body, and an electromechanical energy conversion element provided on the other surface of the elastic body.

13. The vibration actuator according to claim 10, wherein one of a surface of the second pressure transfer member in contact with the second pressure lever and a surface of the second pressure lever in contact with the second pressure transfer member is a flat surface and the other of the surfaces is a spherical surface.

14. The vibration actuator according to claim 10, wherein the second holding member is supported by the second supporting member through slidable fitting, in the direction intersecting with the friction sliding surface of the contact body, between a hole formed in one of the second supporting member and the second holding member and a protruding portion formed on the other.

15. The vibration actuator according to claim 10, wherein the second holding member is connected to the second supporting member by a parallel flat spring mechanism or a parallel link mechanism, whereby the second holding member is supported by the second supporting member.

16. The vibration actuator according to claim 10, wherein a slide portion between the second supporting member and the second holding member, a contact portion of the second vibration element in contact with the contact body, and a contact portion between the second pressure lever and the second pressure transfer member are arranged within a plane intersecting with the friction sliding surface of the contact body, and also parallel to a direction in which the vibration element unit and the contact body move relative to each other.

17. An apparatus comprising:

the vibration actuator according to claim 1, and a component driven by the vibration actuator.

\* \* \* \* \*